US008522336B2

(12) United States Patent
Lin et al.

(10) Patent No.: US 8,522,336 B2
(45) Date of Patent: Aug. 27, 2013

(54) GATEWAY DEVICE AND METHOD FOR USING THE SAME TO PREVENT PHISHING ATTACKS

(75) Inventors: Chien-Teh Lin, Tu-Cheng (TW); Chi-Wen Cheng, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 226 days.

(21) Appl. No.: 13/091,144

(22) Filed: Apr. 21, 2011

(65) Prior Publication Data

US 2012/0240213 A1 Sep. 20, 2012

(30) Foreign Application Priority Data

Mar. 14, 2011 (CN) .......................... 2011 1 0060373

(51) Int. Cl.
*G06F 9/00* (2006.01)
(52) U.S. Cl.
USPC ........................................... 726/12; 713/153
(58) Field of Classification Search
None
See application file for complete search history.

(56) References Cited

U.S. PATENT DOCUMENTS

| 7,027,582 | B2 * | 4/2006 | Khello et al. | 379/220.01 |
| 8,266,672 | B2 * | 9/2012 | Moore | 726/1 |
| 2010/0064047 | A1 * | 3/2010 | Sullivan | 709/228 |
| 2012/0173684 | A1 * | 7/2012 | Courtney et al. | 709/222 |

* cited by examiner

*Primary Examiner* — Christopher Brown
*Assistant Examiner* — Gita Faramarzi
(74) *Attorney, Agent, or Firm* — Altis Law Group, Inc.

(57) ABSTRACT

A gateway device that is in electronic connection with at least one client computer, a first domain name system (DNS) server located in a first communication network, and a second DNS server located in a second communication network separated from the first communication network. When a domain name is transmitted to both the first DNS server and the second DNS server, the first DNS server and the second DNS server respectively resolve the domain name into two groups of internet protocol (IP) addresses, and the gateway device compares the two groups of IP addresses with each other to select one of the two groups of IP addresses that is identified as all IP addresses of which are safe, and allows the client computer to access websites within the first communication network via the selected group of IP addresses to prevent the client computer from phishing attacks.

10 Claims, 3 Drawing Sheets

GATEWAY DEVICE AND METHOD FOR USING THE SAME TO PREVENT PHISHING ATTACKS

BACKGROUND

1. Technical Field

The present disclosure relates to network communication, and particularly to a gateway device capable of preventing phishing attacks and a method for using the same to prevent phishing attacks.

2. Description of Related Art

Phishing attacks often occur in network communication. Generally, phishing attacks change domain name system (DNS) server configurations, DNS caches or local hosts files of network communication system users, such that the users are cheated into accessing false DNS servers. Upon receiving access from the users, the false DNS servers resolve the correct domain names input by the users to predetermined Internet protocol (IP) addresses corresponding to false websites, and thereby make the users access the false websites via these IP addresses. The false websites cheat the users into inputting their private data, such as identification (ID) card numbers, phone numbers, deposit card numbers, and passwords. Thus, these private data of the users are stolen and may be further used to steal property of the cheated users.

Therefore, there is room for improvement within the art.

BRIEF DESCRIPTION OF THE DRAWINGS

Many aspects of the present disclosure can be better understood with reference to the following drawings. The components in the various drawings are not necessarily drawn to scale, the emphasis instead being placed upon clearly illustrating the principles of the present disclosure. Moreover, in the drawings, like reference numerals designate corresponding parts throughout the figures.

DETAILED DESCRIPTION

Figure 1:
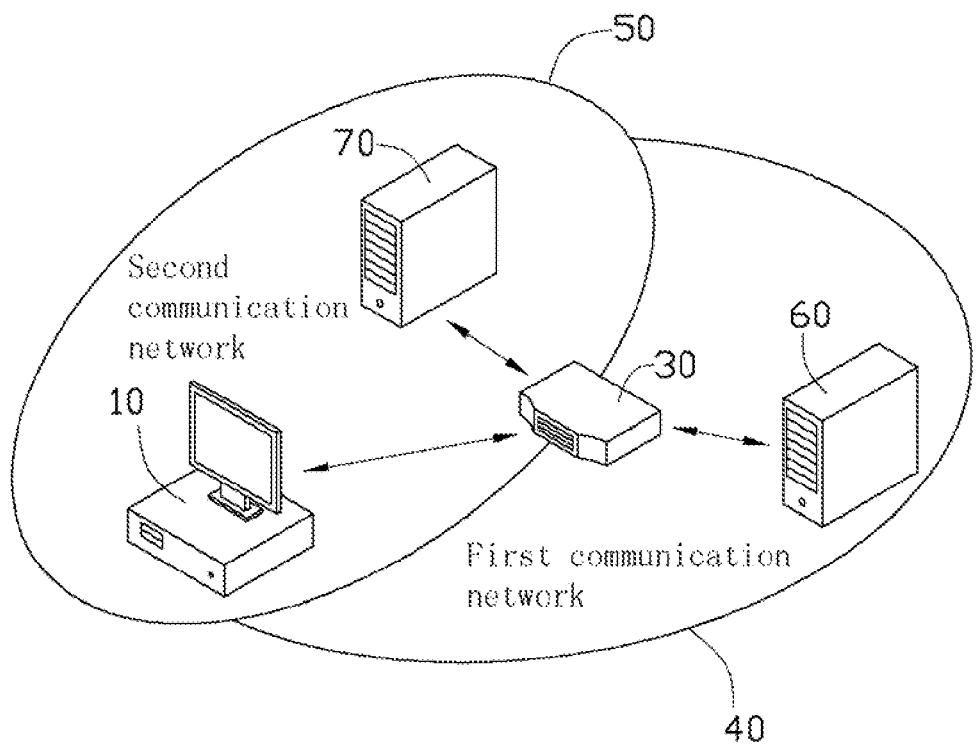
FIG. 1 is a schematic view of an exemplary embodiment of a gateway device in connection with a client computer and two domain name system (DNS) servers.

FIG. 1 is a schematic view of an exemplary embodiment of a gateway device 30 in electronic connection with a client computer 10, a first domain name system (DNS) server 60, and a second DNS server 70. The first DNS server 60 is located in a first communication network 40, and the second DNS server 70 is located in a second communication network 50. In this embodiment, the first communication network 40 is an external communication network, such as Internet. The second communication network 50 is a private communication network that rejects unauthorized accesses, such that the second communication network 50 is separated from external communication networks, such as the first communication network 40. Thus, data stored in the second DNS server 70 and network terminals (not shown) of the second communication network 50 is prevented from being changed by operations (e.g., phishing attack operations) in external networks, such as the first communication network 40. Also referring to FIG. 2, the gateway device 30 includes a processor 31 and a storage unit 32. The processor 31 can receive, process and transmit data. The storage 32 can temporarily store data to be processed by the processor 31 and to be transmitted from the gateway device 30.

In this embodiment, the client computer 10 is a network terminal (e.g., a personal computer) of the second communication network 50. Thus, the client computer 10 is able to directly access the second communication network 50, and data stored in the client computer 10 is prevented from being changed by operations in external networks. Furthermore, the client computer 10 and the gateway device 30 can detect internet protocol (IP) addresses of the first DNS server 60 using typical dynamic host configuration protocol (DHCP), such that the client computer 10 can send domain name information to the first DNS server 60 via the gateway device 30, and further access websites within the first communication network 40.

The first DNS server 60 stores domain names and corresponding IP addresses of all usable websites within the first communication network 40. When one of the stored domain names is input to the client computer 10 and transmitted to the first DNS server 60, the first DNS server 60 resolves the domain name into its corresponding IP addresses, and thus the client computer 10 accesses the websites on the IP addresses corresponding to the input domain name. The second DNS server 70 stores domain names and corresponding IP addresses of predetermined websites that are regarded as being necessary to be protected from phishing attacks. The IP addresses stored in the second DNS server 70 are checked in the second communication network 50 (i.e., on the condition of being separated from external networks) to ensure that all websites corresponding to the IP addresses stored in the second DNS server 70 are true (i.e., to ensure that all of the IP addresses stored in the second DNS server 70 are safe/secure). Accordingly, the first DNS server 60 is used as a normal DNS server that stores usable IP addresses, and the second DNS server 70 is used as a trusted DNS server that stores safe IP addresses.

When a domain name is input to the client computer 10, the processor 31 receives the domain name from the client computer 10 and transmits the domain name to both the first DNS server 60 and the second DNS server 70. The first DNS server 60 and the second DNS server 70 resolve the domain name into two groups of IP addresses respectively stored in the first DNS server 60 and the second DNS server 70 and both corresponding to the domain name. As detailed above, the group of IP addresses provided by the first DNS server 60 includes usable IP addresses corresponding to the domain name, and the group of IP addresses provided by the second DNS server 60 includes safe IP addresses corresponding to the domain name. The two groups of IP addresses are both transmitted back to the processor 31. The processor 31 compares the two groups of IP addresses with each other, selects one of the two groups of IP addresses that is identified as all IP addresses of which being safe, and allows the client computer 10 to access websites within the first communication network 40 via the selected group of IP addresses.

In the above comparison and selection processes, relation between the two groups of IP addresses may be in a number of situations as follows. In a first situation, both the first DNS server 60 and the second DNS server 70 resolve an input domain name into the same group of IP addresses. The first situation means that the IP addresses provided by the second DNS server 70 and the IP addresses provided by the first DNS server 60 are equivalent to each other. Accordingly, the processor 31 identifies that all of the group of IP addresses are safe and usable. Since the first DNS server 60 is located in the first communication network 40 and the second DNS server 70 is separated from the first communication network 40, using the IP addresses provided by the first DNS server 60 to access the first communication network 40 may be easier than using the IP addresses provided by the second DNS server 70 to access the first communication network 40. Therefore, the processor 31 allows the client computer 10 to access websites within the first communication network 40 via the IP addresses provided by the first DNS server 60.

In a second situation, the first DNS server 60 and the second DNS server 70 respectively resolve an input domain name into two different groups of IP addresses, and the IP addresses provided by the first DNS server 60 include at least one IP address that is different to each of the IP addresses provided by the second DNS server 70. Thus, the processor 31 identifies that the at least one IP address that is provided by the first DNS server 60 and different to each of the IP addresses provided by the second DNS sever 70 may correspond to false websites for phishing attacks. Accordingly, the processor 31 only allows the client computer 10 to access websites within the first communication network 40 via the IP addresses provided by the second DNS server 70, and prohibits the client computer 10 to access websites within the first communication network 40 via the at least one IP address that is provided by the first DNS server 60 and different to the IP addresses provided by the second DNS server 70 for preventing phishing attacks. Furthermore, in order to prevent the client computer 10 from accessing unusable websites, the processor 31 can further prohibit the client computer 10 to access websites within the first communication network 40 via IP addresses that are provided by the second DNS server 70 and different to each of the IP addresses provided by the first DNS server 60.

Furthermore, since the first DNS server 60 generally automatically updates the domain name and IP address data stored therein by receiving relative data from the first communication network 40, and the domain name and IP address data stored in the second DNS server 70 generally needs to be manually updated, a third situation and a fourth situation may occur in above comparison and selection processes, as detailed as follows.

In the third situation, the first DNS server 60 and the second DNS server 70 respectively resolve an input domain name into two different groups of IP addresses, and the IP addresses provided by the second DNS server 70 include IP addresses that are equivalent to all of the IP addresses provided by the first DNS server 60 and at least one IP address that is different to each of the IP addresses provided by the first DNS server 60. The reason for this situation is most likely that some websites within the first communication network 40 are proved to be unusable (e.g., malfunctioning or removed) and the first DNS server 60 deletes IP address data corresponding to these websites during automatically updating processes, while the second DNS server 70 still stores IP address data corresponding to these malfunctioning or removed websites before it is manually updated. In this situation, since all the IP addresses provided by the first DNS server 60 are equivalent to some of the IP addresses provided by the second DNS server 70, and only the IP addresses provided by the first DNS server 60 are usable, the processor 31 allows the client computer 10 to access websites within the first communication network 40 via the IP addresses provided by the first DNS server 60.

In the fourth situation, when a seldom used domain name that has no relative domain name and IP address data stored in the second DNS server 70 is input to the client computer 10 and transmitted to both the first DNS server 60 and the second DNS server 70, only the first DNS server 60 resolves the domain name into a group of IP addresses and provides the group of IP addresses to the gate way 30, and the second DNS server 70 is unable to resolve the seldom used domain name into any IP address (i.e., the group of IP addresses provided by the second DNS server is empty). Since false websites for phishing attacks generally pretend to be frequently accessed websites having widely used domain names, probability of using a false website to pretend the true website corresponding to the seldom used domain name for phishing attacks is very low. Therefore, the processor 31 identifies that all of the IP addresses provided by the first DNS sever 60 are safe IP addresses (i.e., corresponding to true websites within the first communication network 40), and allows the client computer 10 to access websites within the first communication network 40 via the IP address provided by the first DNS sever 60.

Figure 2:
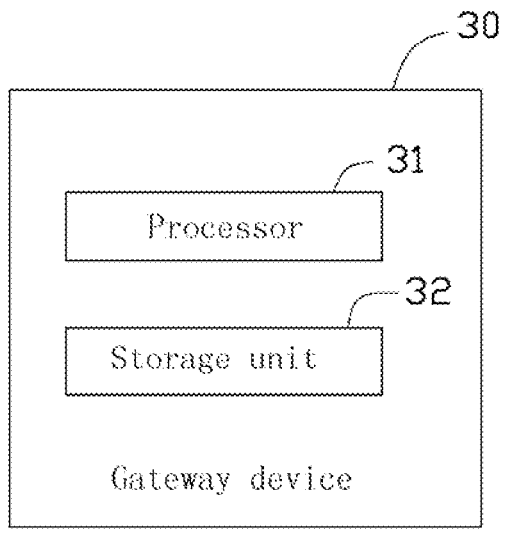
FIG. 2 is a block diagram of the gateway device shown in FIG. 1.
Figure 3:
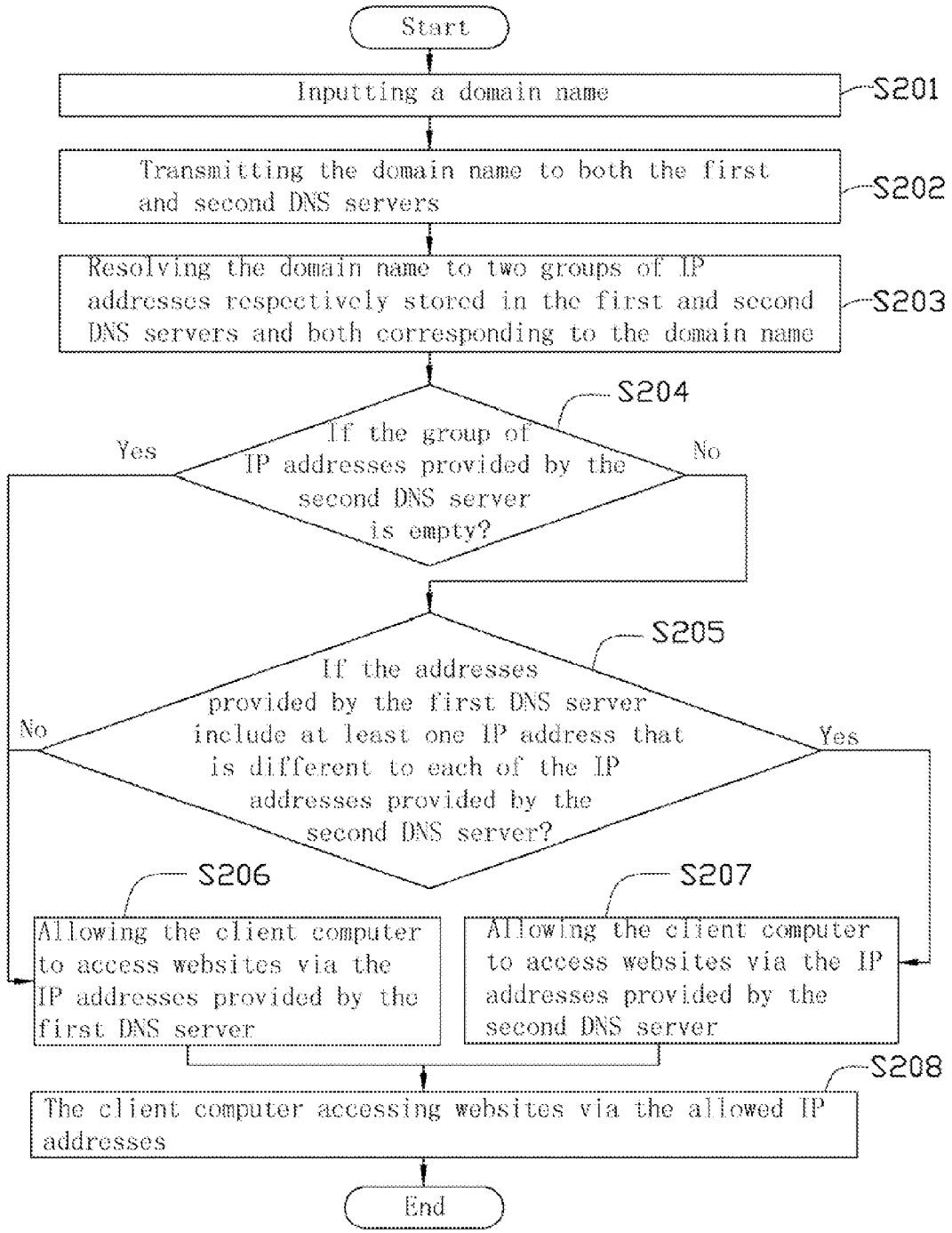
FIG. 3 is a flow chart of a method for using the gateway device shown in FIG. 1 to prevent phishing attacks.

Also referring to FIG. 2, a method for using the gateway device 30 to prevent phishing attacks to the client computer 10, according to an exemplary embodiment, is provided. The method includes steps as follows. It should be known that depending on the embodiment, additional or less steps may be added or the ordering of the steps may be changed.

First, a domain name is input to the client computer 10, and the client computer 10 transmits the domain name to the gateway device 30 (Step S201).

The processor 31 of the gateway device 30 transmits the domain name to both the first DNS server 60 and the second DNS server 70 (Step S202).

The first DNS server 60 and the second DNS server 70 resolve the domain name into two groups of IP addresses respectively stored in the first DNS server 60 and the second DNS server 70 and both corresponding to the domain name, and the two groups of IP addresses are both transmitted back to the processor 31 (Step S203).

The processor 31 identifies whether the group of IP addresses provided by the second DNS server 70 is empty (Step S204). If the group of IP addresses provided by the second DNS server 70 is not empty (i.e., the second DNS server 70 can resolve the domain name into at least one IP address), the processor 31 further compares the two groups of IP addresses provided by the first DNS server 60 and the second DNS server 70 with each other, thereby identifying if the addresses provided by the first DNS server 60 include at least one IP address that is different to each of the IP addresses provided by the second DNS server 70 (Step S205).

In the comparison of Step S205, if none of the IP addresses provided by the first DNS server 60 is different to each of the IP addresses provided by the second DNS server 70, it means that the both the first DNS server 60 and the second DNS server 70 resolve the domain name into the same group of IP addresses, or the IP addresses provided by the second DNS server 70 include equivalent to all of the IP addresses provided by the first DNS server 60 and at least one IP address that is different to each of the IP addresses provided by the first DNS server 60. Thus, above first situation or third situation occur. Upon either the first situation or the third situation, the processor 31 allows the client computer 10 to access websites within the first communication network 40 via the IP addresses provided by the first DNS server 60, according to above detailed disclosure (Step S206).

If the IP addresses provided by the first DNS server 60 include at least one IP address that is different to each of the IP addresses provided by the second DNS server 70, above second situation occurs. According to above detailed disclosure, the processor 31 only allows the client computer 10 to access websites within the first communication network 40 via the IP addresses provided by the second DNS server 70, and prohibits the client computer 10 to access websites via the IP addresses that are provided by the first DNS server 60 and different to the IP addresses provided by the second DNS sever 70 for preventing phishing attacks (Step S207).

Furthermore, if the processor 31 identifies that the group of IP addresses provided by the second DNS server 70 is empty in Step S204, it means that above fourth situation occurs. According to above detailed disclosure, the processor 31 allows the client computer 10 to access websites within the first communication network 40 via the IP addresses provided by the first DNS server 60 (i.e., also performs Step S206).

After either Step S206 or Step S207, the client computer 10 accesses websites within the first communication network 40 via the IP addresses allowed to be used by processor 31 (Step S208).

In the present disclosure, the first DNS server 60 and the second DNS server 70 respectively resolve each domain name input to the client computer 10 into two groups of IP addresses. Since the IP addresses provided by the second DNS server 70 are the safe IP addresses, on the condition that the group of IP addresses provided by the second DNS server 70 is not empty, the gateway device 30 only allows the client computer 10 to access websites within the first communication network 40 via the IP addresses provided by the second DNS server 70, or the IP addresses provided by the first DNS server 60 and being equivalent to all or some of the IP addresses provided by the second DNS server 70. In this way, the client computer 10 can be protected from phishing attacks coming from the first communication network 40. Additionally, when more client computers (not shown) are connected to the gateway device 30, the gateway device 30 can be used to protect all the client computers connected thereto from phishing attacks coming from the first communication network 40 according to above method.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A gateway device that is in electronic connection with at least one client computer, a first domain name system (DNS) server located in a first communication network, and a second DNS server located in a second communication network separated from the first communication network, comprising:
    a processor; and
    a storage unit;
    wherein the first DNS server stores domain names and corresponding internet protocol (IP) addresses of all usable websites within the first communication network, and the second DNS server stores domain names and corresponding IP addresses of predetermined websites, all websites corresponding to the IP addresses stored in the second DNS server ensured to be true; when the processor receives a domain name from the client computer and transmits the domain name to both the first DNS server and the second DNS server, the first DNS server and the second DNS server respectively resolve the domain name into two groups of IP addresses, and the processor compares the two groups of IP addresses with each other to select one of the two groups of IP addresses that is identified as all IP addresses of which are safe, and allows the client computer to access websites within the first communication network via the selected group of IP addresses to prevent the client computer from phishing attacks; and
    wherein when the first DNS server and the second DNS server respectively resolve the domain name to two different groups of IP addresses, and the IP addresses provided by the second DNS server include IP addresses that are equivalent to all of the IP addresses provided by the first DNS server and at least one IP address that is different to each of the IP addresses provided by the first DNS server, the processor allows the client computer to access websites within the first communication network via the IP addresses provided by the first DNS server.

2. The gateway device as claimed in claim 1, wherein the first communication network is an external communication network, and the second communication network is a private communication network that rejects unauthorized accesses.

3. The gateway device as claimed in claim 1, wherein when the first DNS server and the second DNS server resolve the domain name to the same group of IP addresses, the processor allows the client computer to access websites within the first communication network via the IP addresses provided by the first DNS server.

4. The gateway device as claimed in claim 1, wherein when the first DNS server and the second DNS server respectively resolve the domain name to two different groups of IP addresses, and the IP addresses provided by the first DNS server include at least one IP address that is different to each of the IP addresses provided by the second DNS server, the processor only allows the client computer to access websites within the first communication network via the IP addresses provided by the second DNS server, and prohibits the client computer to access websites within the first communication network via the at least one IP address that is provided by the first DNS server and different to the IP addresses provided by the second DNS server.

5. The gateway device as claimed in claim 4, wherein the processor further prohibits the client computer to access websites within the first communication network via IP addresses that are provided by the second DNS server and different to each of the IP addresses provided by the first DNS server.

6. The gateway device as claimed in claim 1, wherein when only the first DNS server resolves the domain name to a group of IP addresses and the group of IP addresses provided by the second DNS server is empty, the processor identifies that all of the IP addresses provided by the first DNS sever are safe, and allows the client computer to access websites within the first communication network via the IP address provided by the first DNS sever.

7. A method of using a gateway device to prevent phishing attacks to at least one client computer, comprising:
    inputting a domain name to the client computer;
    transmitting the domain name to a first domain name system (DNS) server and a second DNS server through the gateway device, wherein the first DNS server is located in a first communication network and stores domain names and corresponding internet protocol (IP) addresses of all usable websites within the first communication network, and the second DNS is located in a second communication network separated from the first communication network and stores domain names and corresponding IP addresses of predetermined websites, all websites corresponding to the IP addresses stored in the second DNS server ensured to be true;
    using the first DNS server and the second DNS server to resolve the domain name into two groups of IP addresses respectively stored in the first DNS server and the second DNS server;

using the gateway device to identify whether the group of IP addresses provided by the second DNS server is empty;

if the group of IP addresses provided by the second DNS server is empty, using the gateway device to allow the client computer to access websites within the first communication network via the IP addresses provided by the first DNS server; and if the group of IP addresses provided by the second DNS server is not empty, using the gateway device to compare the two groups of IP addresses with each other;

using the gateway device to identify if the addresses provided by the first DNS server include at least one IP address that is different to each of the IP addresses provided by the second DNS server;

if none of the IP addresses provided by the first DNS server is different to each of the IP addresses provided by the second DNS server, using the gateway device to allow the client computer to access websites within the first communication network via the IP addresses provided by the first DNS server; and if the IP addresses provided by the first DNS server include at least one IP address that is different to each of the IP addresses provided by the second DNS server, using the gateway device to allow the client computer to access websites within the first communication network via the IP addresses provided by the second DNS server; and using the client computer to access websites within the first communication network via the selected group of IP addresses.

8. The method as claimed in claim 7, wherein the first communication network is an external communication network, and the second communication network is a private communication network that rejects unauthorized accesses.

9. The method as claimed in claim 7, further comprising:
if the IP addresses provided by the first DNS server include at least one IP address that is different to each of the IP addresses provided by the second DNS server, using the gateway device to prohibit the client computer to access websites via the IP addresses that are provided by the first DNS server and different to the IP addresses provided by the second DNS sever.

10. The method as claimed in claim 7, further comprising:
after using the gateway device to allow the client computer to access websites within the first communication network via the IP addresses provided by the second DNS server, using the gateway device to prohibit the client computer to access websites within the first communication network via IP addresses that are provided by the second DNS server and different to each of the IP addresses provided by the first DNS server.

* * * * *